United States Patent
Call et al.

(10) Patent No.: US 10,201,881 B2
(45) Date of Patent: Feb. 12, 2019

(54) SYSTEM AND METHOD FOR MANUFACTURING A TOP MOUNT

(71) Applicant: MCS Manufacturing, LLC, Lyons, OH (US)

(72) Inventors: Aaron Call, Lyons, OH (US); Stephen Cameron, Marysville, OH (US)

(73) Assignee: MCS Manufacturing, LLC, Lyons, OH (US)

( * ) Notice: Subject to any disclaimer, the term of this patent is extended or adjusted under 35 U.S.C. 154(b) by 173 days.

(21) Appl. No.: 15/216,745

(22) Filed: Jul. 22, 2016

(65) Prior Publication Data
US 2016/0325388 A1    Nov. 10, 2016

Related U.S. Application Data

(62) Division of application No. 14/268,191, filed on May 2, 2014, now Pat. No. 9,539,678.

(51) Int. Cl.
| | |
|---|---|
| *B23P 11/00* | (2006.01) |
| *B62D 25/08* | (2006.01) |
| *B60G 15/06* | (2006.01) |
| *B23P 19/02* | (2006.01) |
| *B60G 7/02* | (2006.01) |

(52) U.S. Cl.
CPC ............. *B23P 19/02* (2013.01); *B23P 11/005* (2013.01); *B60G 7/02* (2013.01); *B60G 15/068* (2013.01); *B62D 25/082* (2013.01); *B62D 25/088* (2013.01); *B23P 2700/14* (2013.01); *B60G 2204/128* (2013.01); *B60G 2206/01* (2013.01); *B60G 2206/8102* (2013.01); *B60G 2206/91* (2013.01); *Y10T 29/49917* (2015.01); *Y10T 29/53709* (2015.01)

(58) Field of Classification Search
CPC ..... B23P 19/02; B23P 11/005; B23P 2700/14; B60G 15/068; B60G 7/02; B60G 2206/91; B60G 2204/128; B60G 2206/8102; B60G 2206/01; B62D 25/088; B62D 25/082; Y10T 29/53709; Y10T 29/49917

See application file for complete search history.

(56) References Cited

U.S. PATENT DOCUMENTS 7,073,364 B2    7/2006 Krish, Sr. et al.

*Primary Examiner* — John C Hong
(74) *Attorney, Agent, or Firm* — Jacob M. Ward; Ward Law Office LLC

(57) ABSTRACT

A system and method for manufacturing a top mount for a vehicle suspension includes loading a top mount body, a journal, and a plurality of knurled studs into a lower die assembly. The lower die assembly includes a stationary die base, a floating die top, and a pusher shaft. A pusher head assembly applies a downward pressure to insert the knurled studs into the top mount body, while the pusher shaft substantially simultaneously applies an upward pressure to insert the journal into the top mount body. The floating die top and the pusher head assembly are raised in tandem to eject the top mount from the stationary die base. The floating die top and the pusher head assembly then retract so that the top mount can be removed from the system.

8 Claims, 13 Drawing Sheets

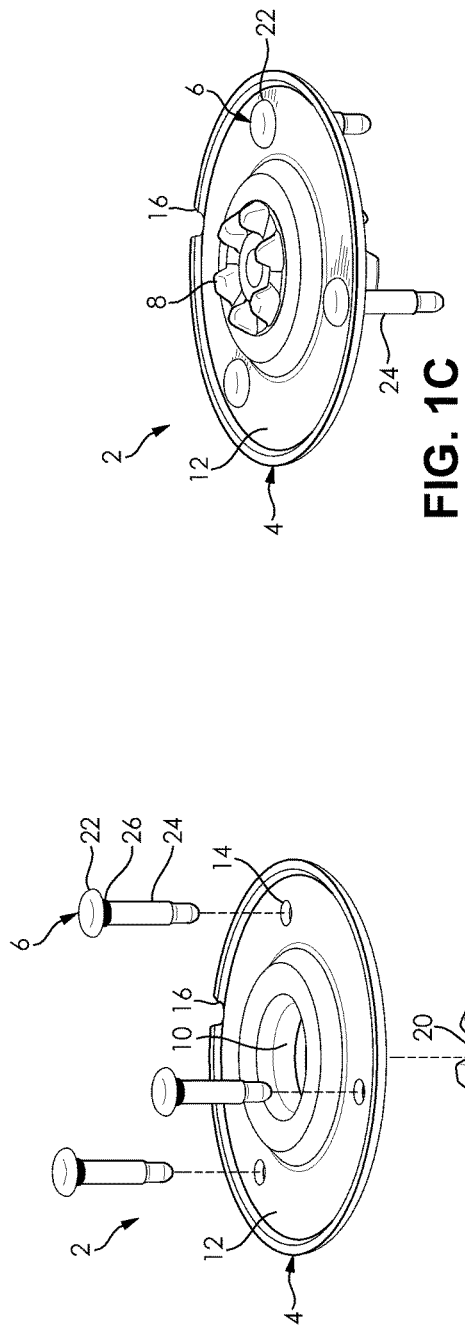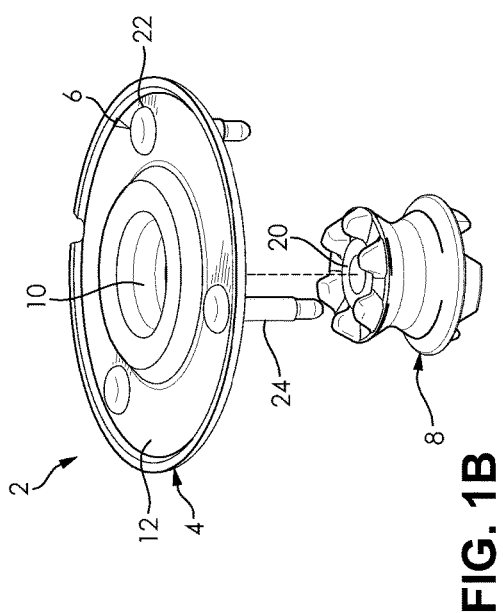

SYSTEM AND METHOD FOR MANUFACTURING A TOP MOUNT

CROSS-REFERENCE TO RELATED APPLICATIONS

This application is a divisional of U.S. patent application Ser. No. 14/268,191, filed on May 2, 2014. The entire disclosure of the above application is hereby incorporated herein by reference.

FIELD

The present disclosure relates to top mounts for vehicle suspensions and, more particularly, systems and methods for the assembly of top mounts.

BACKGROUND

A top mount couples a vehicle suspension strut to a support structure of the vehicle, and improves spring suspension and ride, and jounce and rebound control. Conventional upper strut mounts include at least one resilient journal, usually formed from a rubber body with a metal core. The journal isolates and reduces transmission of road inputs to a vehicle body.

Traditionally, assembly of the top mount has required multiple stations in order to carry out the assembly operations. In a first station, the studs are attached to the mount plate. The incomplete top mount assembly is then removed from the first station and delivered to a second station, where the journal is disposed within the top mount body. This multi-station process is inefficient, as it requires additional machinery for both transport and assembly of the top mount. This process also requires additional manpower, as two separate stations must be maintained during the manufacturing process.

There is a continuing need for a system and method of assembling a top mount at a single station. Desirably, the system and method of assembling the top mount is efficient and permits a rapid manufacture of the top mount by an individual operator.

SUMMARY

In concordance with the instant disclosure, a system and method for manufacturing a top mount in a single station, which is efficient and permits a rapid manufacture of the top mount by an individual operator, has been surprisingly discovered.

In one embodiment, a system for manufacturing a top mount of a vehicle suspension includes a floating die top configured to receive a top mount body. The top mount body has a journal opening and a plurality of stud holes. A plurality of knurled studs are removably disposed in the stud holes. The floating die top has a primary opening and a plurality of secondary openings formed therethrough. The primary opening is configured to receive and align a journal adjacent the journal opening of the top mount body. The system further includes a stationary die base having a plurality of crimp blocks. The crimp blocks are disposed in the secondary openings of the floating die top. The floating die top is slidably disposed over the crimp blocks. Each of the crimp blocks is configured to receive one of the knurled studs. A pusher head assembly is configured to selectively move to and from a resting position and a crimping position. The pusher head assembly, when in the crimping position, contacts the top mount body to press the knurled studs into the top mount body and to cause the crimp blocks of the stationary die base to crimp the top mount body adjacent the knurled studs. The knurled studs are thereby affixed to the top mount body. A pusher shaft is configured to selectively move to and from a retracted position and an inserting position through the stationary die base. The pusher shaft, when in the inserting position, contacts and advances the journal into the journal opening of the top mount body. The journal is thereby affixed to the top mount body.

In another embodiment, the pusher head assembly is coupled to a pusher head assembly actuator configured to cause the pusher head assembly to selectively move to and from the resting position and the crimping position. The pusher shaft is coupled to a pusher shaft actuator configured to cause the pusher shaft to move to and from the retracted position and the inserting position. A floating die top actuator is coupled to the floating die top. The floating die top actuator is configured to cause the floating die top to move a predetermined distance in tandem with the pusher head assembly, as the pusher head assembly moves toward a resting position following a crimping operation.

The system may further include a controller configured to selectively move the pusher head assembly, the pusher shaft, and the floating die top. A plurality of sensors including at least one of a force sensor and a position sensor are in communication with the controller and provide feedback on at least one of a force applied by the pusher head assembly and a position of at least one of the floating die top and the pusher shaft. An oiler assembly is disposed adjacent the floating die top, and is configured to receive the top mount body and lubricate the journal opening of the top mount body with a lubricant. The floating die top, the stationary die base, the pusher head assembly, the pusher shaft, the controller, the sensors, and the oiler assembly are mounted in a unitary frame assembly.

In yet another embodiment of the instant disclosure, a method for manufacturing a top mount of a vehicle suspension is disclosed. The method includes providing a top mount body having a journal opening and a plurality of stud holes, a plurality of knurled studs, and a journal. The knurled studs are then inserted in the stud holes of the top mount body. Substantially simultaneously, a pressure is applied to the top mount body to crimp the knurled studs in the stud holes of the top mount body, and a separate pressure is applied to the journal to insert the journal into the journal opening of the top mount body.

BRIEF DESCRIPTION OF THE DRAWINGS

The above, as well as other advantages of the present disclosure, will become readily apparent to those skilled in the art from the following detailed description, particularly when considered in the light of the drawings described hereafter.

FIG. 1A is an exploded front perspective view of a top mount according to one embodiment of the disclosure;

FIG. 1B is a partially exploded front perspective view of the top mount of FIG. 1A, with knurled studs disposed in stud holes of a top mount body;

FIG. 1C is a front perspective view of the assembled top mount of FIG. 1A, a journal shown disposed in a journal opening of a top mount body;

DETAILED DESCRIPTION

Figure 2A:
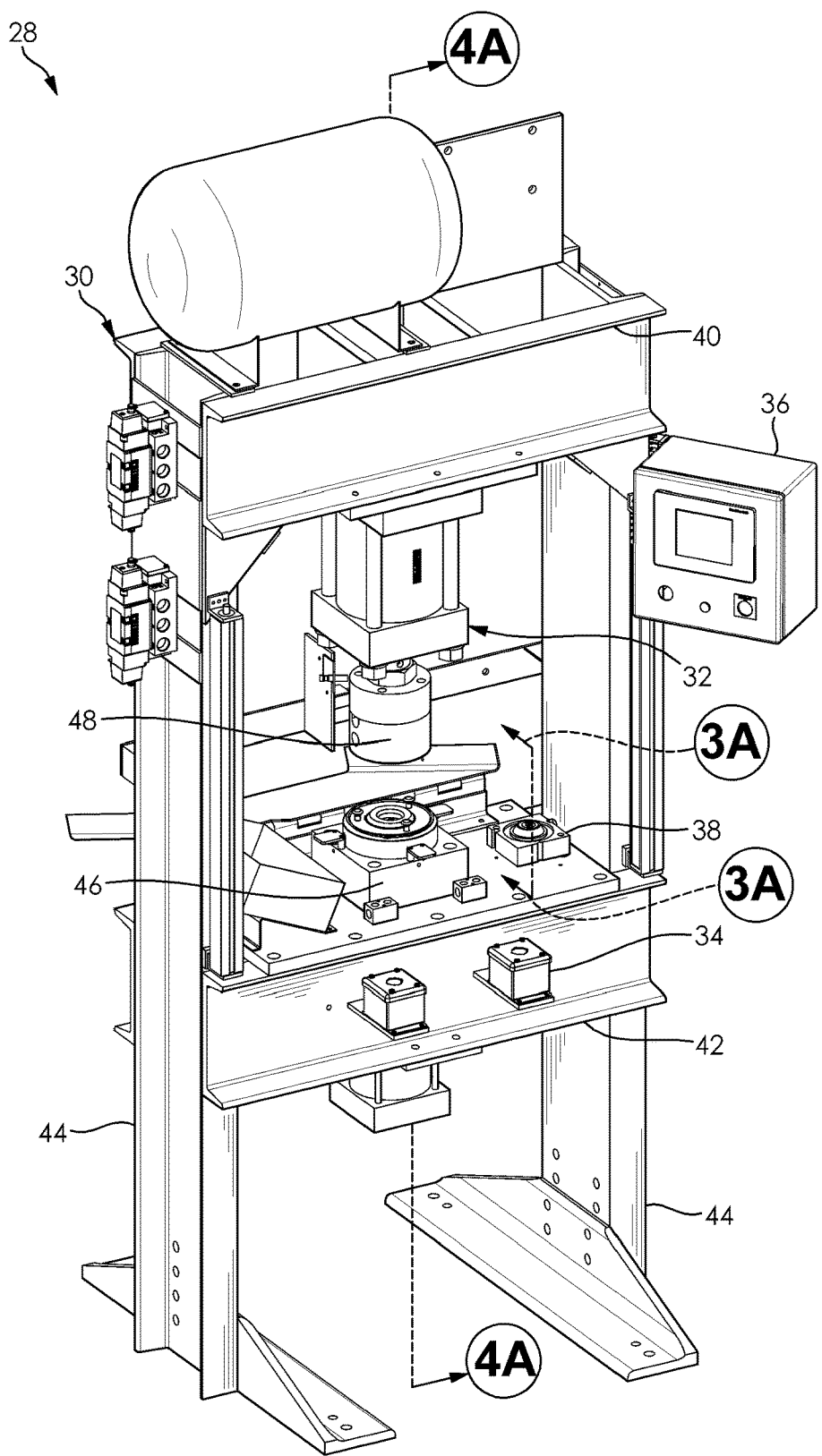
FIG. 2A is a front-left perspective view of a system for assembly of a top mount according to one embodiment of the disclosure, wherein the system is shown in a loading step where a journal, a top mount body, and knurled studs are disposed in the system.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1A-1C illustrate a top mount 2 in progressive states of assembly. In FIG. 1A, an exploded view of the component parts of the top mount 2 prior to assembly is shown. The component parts of the top mount 2 include a top mount body 4, a plurality of knurled studs 6, and an insert body such as a journal 8. The illustrated top mount body 4 is of an annular shape, and further comprises an opening such as a journal opening 10. The journal opening 10 has a semi-toroidal inner profile. An annular mounting flange 12 extends radially outwardly from the journal opening 10. A plurality of stud holes 14 are disposed through the mounting flange 12.

Although described hereinabove having a generally annular shape, it should be appreciated that the top mount body 4 may be of any one of a plurality of different shapes, such as tri-ovular, elliptical, or polygonal, for example. The mounting flange 12 may also include an alignment feature 16 disposed therein for maintaining alignment of the stud holes 14 during assembly of the top mount 2.

The journal 8 is a resilient member having a journal body 18, typically formed of a polymeric material. The journal 8 is substantially cylindrical in shape, having a cylindrical inner bore in which a cylindrical rigid sleeve 20 is received, and a semi-toroidal outer profile corresponding substantially to the inner profile of the journal opening 10. In particular embodiments, the rigid sleeve 20 may be formed from a metal such as aluminum. One of ordinary skill in the art may select suitable materials for the journal body 18 and the rigid sleeve 20, as desired.

The knurled stud 6 includes a head 22, a threaded shank 24 extending from the head 22, and a knurled shoulder 26 disposed intermediate the head 22 and the threaded shank 24. An outer diameter of the knurled shoulder 26 is larger than an inner diameter of the respective stud holes 14, and includes a plurality of protrusions extending radially outwardly therefrom.

FIG. 1B illustrates the top mount 2 in a partly assembled state, wherein the knurled studs 6 have been removably inserted into the stud holes 14. The knurled shoulders 26 are pressed into the respective stud holes 14, as shown, forming a frictional interference between the protrusions of the knurled shoulder 26 and the inner diameter of the stud holes 14 such that the knurled studs 6 are affixed within the stud holes 14. In addition to the frictional interference between the knurled shoulders 26 and the inner diameter of the stud holes 14, a crimp is formed by the stud holes 14 around the knurled studs 6 to further secure the knurled studs 6 within the stud holes 14.

In FIG. 1C, a fully assembled top mount 2 is illustrated, where the journal 8 has been inserted through the journal opening 10 in the top mount body 4 such that the outer profile of the journal 8 is constrained by the inner profile of the journal opening 10. Further movement of the journal 8 within the journal opening 10 is thereby inhibited by this constraint.

One embodiment of a system according to the disclosure is illustrated in FIGS. 2A-6. As shown, the system is a press assembly 28 including a press frame 30, a die assembly 32, a plurality of sensors 34, a controller 36, and an oiler assembly 38. The press frame 30 includes an upper press frame 40 and a press bed 42, each disposed between a pair of uprights 44.

The die assembly 32 includes a lower die assembly 46, which is supported by the press bed 42 of the press frame 30, and an upper die assembly 48, which depends from the upper press frame 40.

Figure 3A:
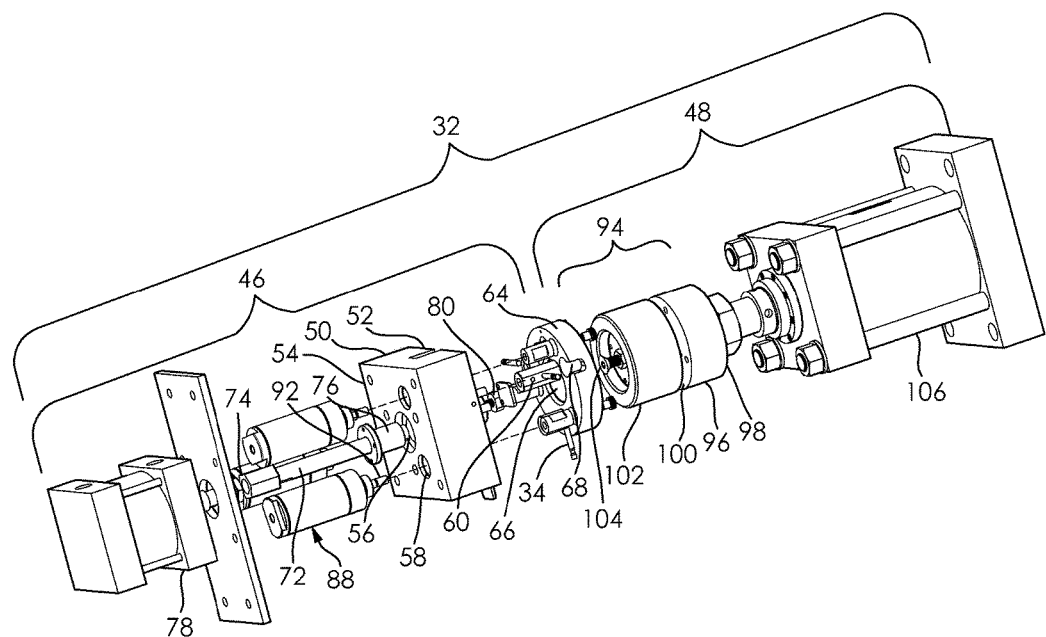
FIG. 3A is an exploded front perspective view of the die assembly of the system of FIG. 2A.
Figure 5:
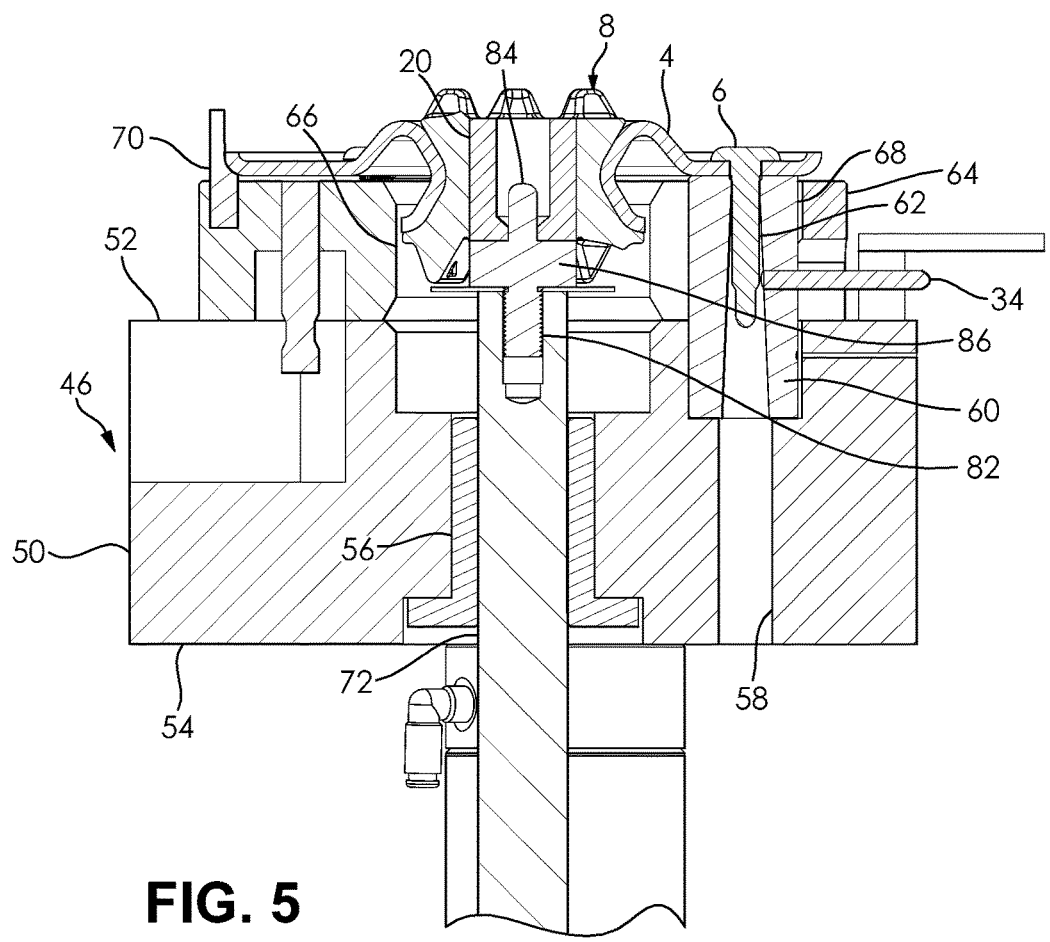
FIG. 5 is a cross-sectional side elevational view taken through a central axis of a lower die assembly of the system depicted in FIGS. 2A-2D.
Figure 6:
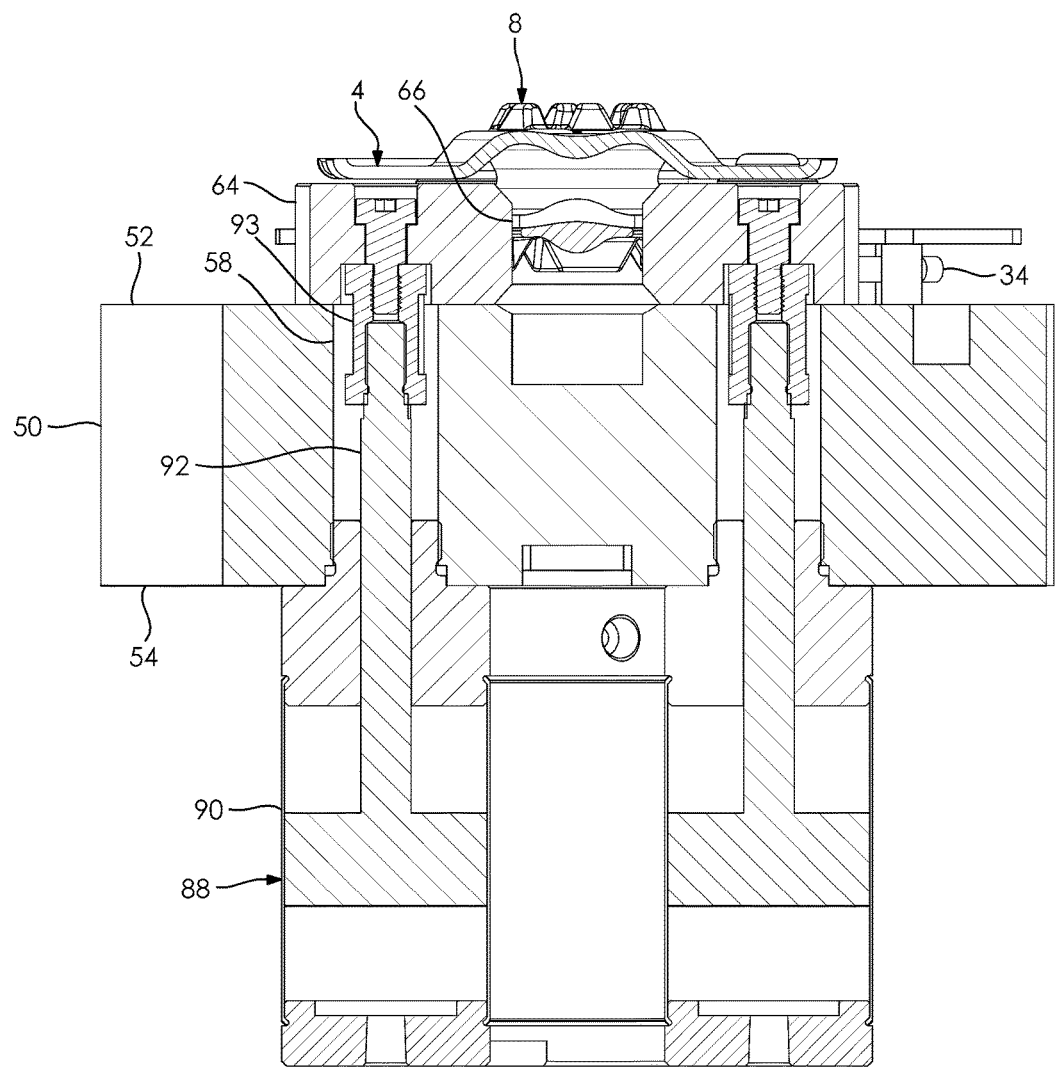
FIG. 6 is a cross-sectional side elevational view showing the floating die top cylinder of the lower die assembly of the system depicted in FIGS. 2A-2D.

As shown in FIGS. 3A and 5, the lower die assembly 46 includes a stationary die base 50. The exemplary stationary die base 50 is cuboidal in shape and includes an opposing top face 52 and bottom face 54. A primary bore 56 and a plurality of secondary bores 58 traverse the thickness of the stationary die base 50 from the top face 52 to the bottom face 54. The primary bore 56 is cylindrical in shape, having an inner diameter sufficient to receive the journal 8 therein, and extends vertically through the stationary die base 50. The secondary bores 58 are spaced about the primary bore 56. In the illustrated embodiment, there are three secondary bores 58 spaced equally about the primary bore 56, but other quantities and spacings may be apparent to those of ordinary skill in the art.

A plurality of crimp blocks 60 protrude from the top face 52 of the stationary die base 50 and include fixture holes 62 therein for receiving the threaded shank 24 of the knurled studs 6. In the exemplary embodiment, the crimp blocks 60 are cylindrical in shape and are frictionally received into corresponding bores formed in the stationary die base 50. However, the crimp blocks 60 may be of other geometries, and may be joined to the stationary die base 50 using helical threads, bonding, or welding, as nonlimiting examples. The crimp blocks 60 and the stationary die base 50 may also be made of a single unitary body, as desired.

A floating die top 64 is further included in the lower dies assembly 46. The floating die top 64 is disposed adjacent to the top face 52 of the stationary die base 50. The floating die top 64 includes a primary opening 66 and a plurality of secondary openings 68 spaced about the primary opening 66. The primary opening 66 is axially aligned with the primary bore 56 and the secondary openings 68 are axially aligned with crimp blocks 60 of the stationary die base 50. Each of the secondary bores 58 of the floating die top 64 is appropriately sized to slidably receive a respective crimp block 60 therethrough, wherein when the floating die top 64 abuts the top face 52 of stationary die base 50, the crimp blocks 60 extend through, and protrude from, the floating die top 64. An alignment dowel 70 may be included on the floating die top 64 for engaging the alignment feature 16 of the top mount body 4.

A pusher shaft 72 having an opposing first end 74 and second end 76 is disposed through the primary bore 56 of the stationary die base 50. The pusher shaft 72 is selectively positionable in a retracted position and in an inserting position. In the retracted position, the second end 76 of the pusher shaft 72 is disposed substantially within the primary bore 56 of the stationary die base 50. In the inserting position, the second end 76 of the pusher shaft 72 is extended beyond the primary bore 56. In the illustrative embodiment, the first end 74 of the pusher shaft 72 is connected to a pusher shaft actuator 78 beneath the stationary die base 50. The pusher shaft actuator 78 can be any type of actuator capable of providing linear translation of the pusher shaft 72 through the primary bore 56 of the stationary die base 50, such as a pneumatic actuator, a hydraulic actuator, or a mechanical actuator, for example. In the illustrative embodiment, the pusher shaft actuator 78 is a pneumatic actuator such as a pneumatic stroker cylinder. The pusher shaft actuator 78 is capable of providing a force sufficient to insert the journal 8 into the journal opening 10 of the top mount body 4.

A center post 80 is disposed adjacent to the second end 76 of the pusher shaft 72 and extends therefrom. The center post 80 includes mounting shank 82, a mandrel 84, and a collar 86. The mounting shank 82 of the center post 80 is attached to the second end 76 of the pusher shaft 72, such that the extension of the center post 80 from the second end 76 of the pusher shaft 72 is adjustable. In the illustrated embodiment of FIG. 5, for example, the center post 80 has external helical threads for engaging internal helical threads of a bore in the second end 76 of the pusher shaft 72. An extension of the center post 80 is adjusted by rotating the center post 80 with respect to the pusher shaft 72. The collar 86 is disposed at an end of the mounting shank 82, intermediate the mounting shank 82 and the mandrel 84. The mandrel 84 may be cylindrical in shape, and extends from the collar 86 opposite the mounting shank 82.

With renewed reference to FIG. 3A, an at least one floating die top cylinder 88 is included in the lower die assembly 46 and includes a cylinder body 90 attached to the stationary die base 50 and a cylinder rod 92. The cylinder rod 92 extends through the secondary bore 58 of the stationary die base 50 and is coupled to the floating die top 64 via a coupling 93. The cylinder rod 92 is selectively positionable between a first retracted position and a second extended position. The floating die top 64 abuts the stationary die base 50 when the cylinder rod 92 is in the retracted position. The floating die top 64 is spaced apart from the stationary die base 50 when the cylinder rod 92 is moved to the extended position. In the illustrative embodiment, three floating die top cylinders 88 are included in the lower die assembly 46. It should be appreciated that any number of cylinders may be used within the scope of the present disclosure.

Figure 2B:
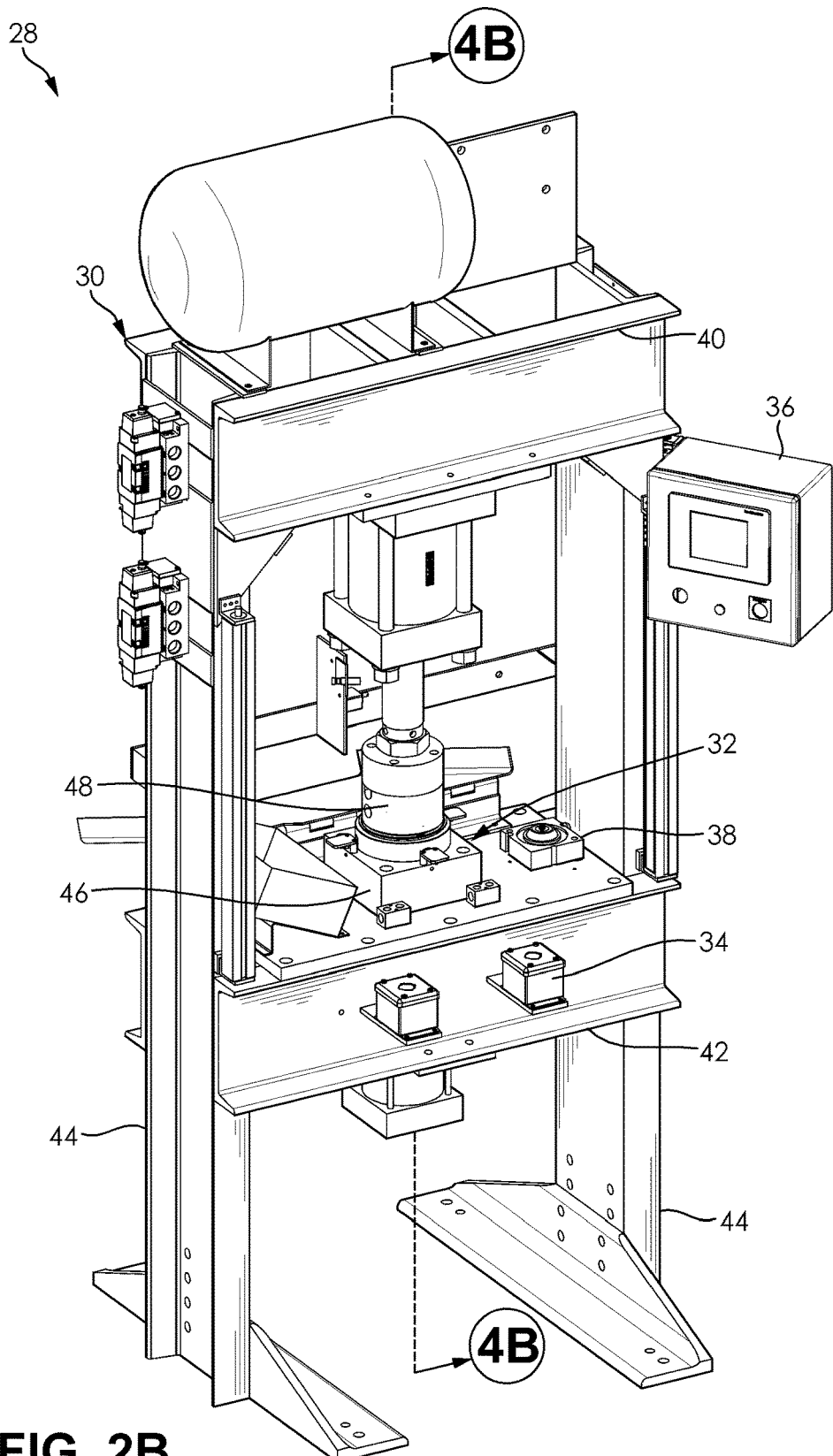
FIG. 2B is a front-left perspective view of a system for assembly of a top mount according to one embodiment of the disclosure, wherein the system is shown in an assembly step where the knurled studs are affixed to the top mount body by crimping and the journal is advanced through a journal opening of the top mount body.
Figure 2C:
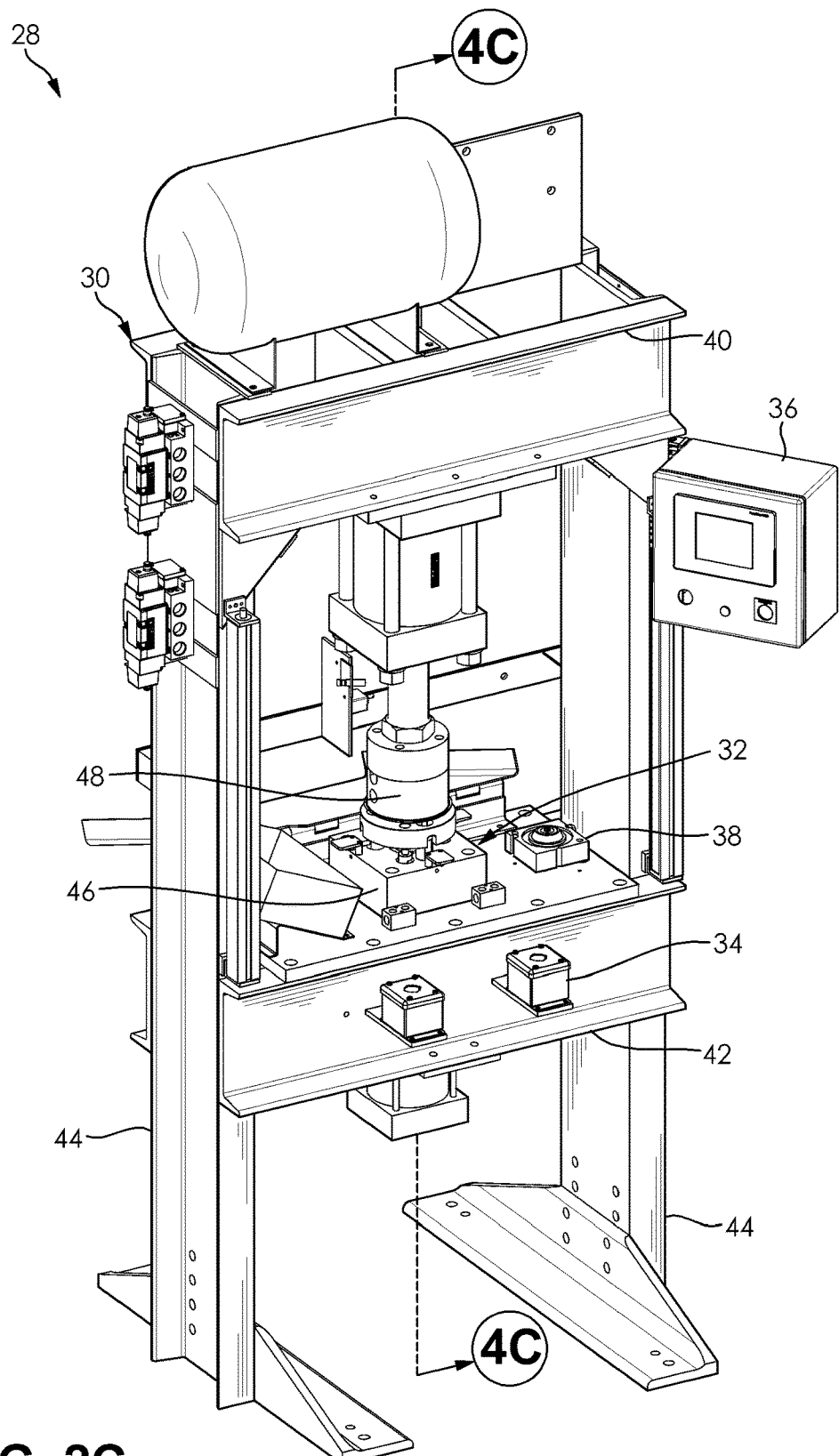
FIG. 2C is a front-left perspective view of a system for assembly of a top mount according to one embodiment of the disclosure, wherein the system is shown in a stripping step where a pusher head assembly moves in tandem with the floating die top.
Figure 2D:
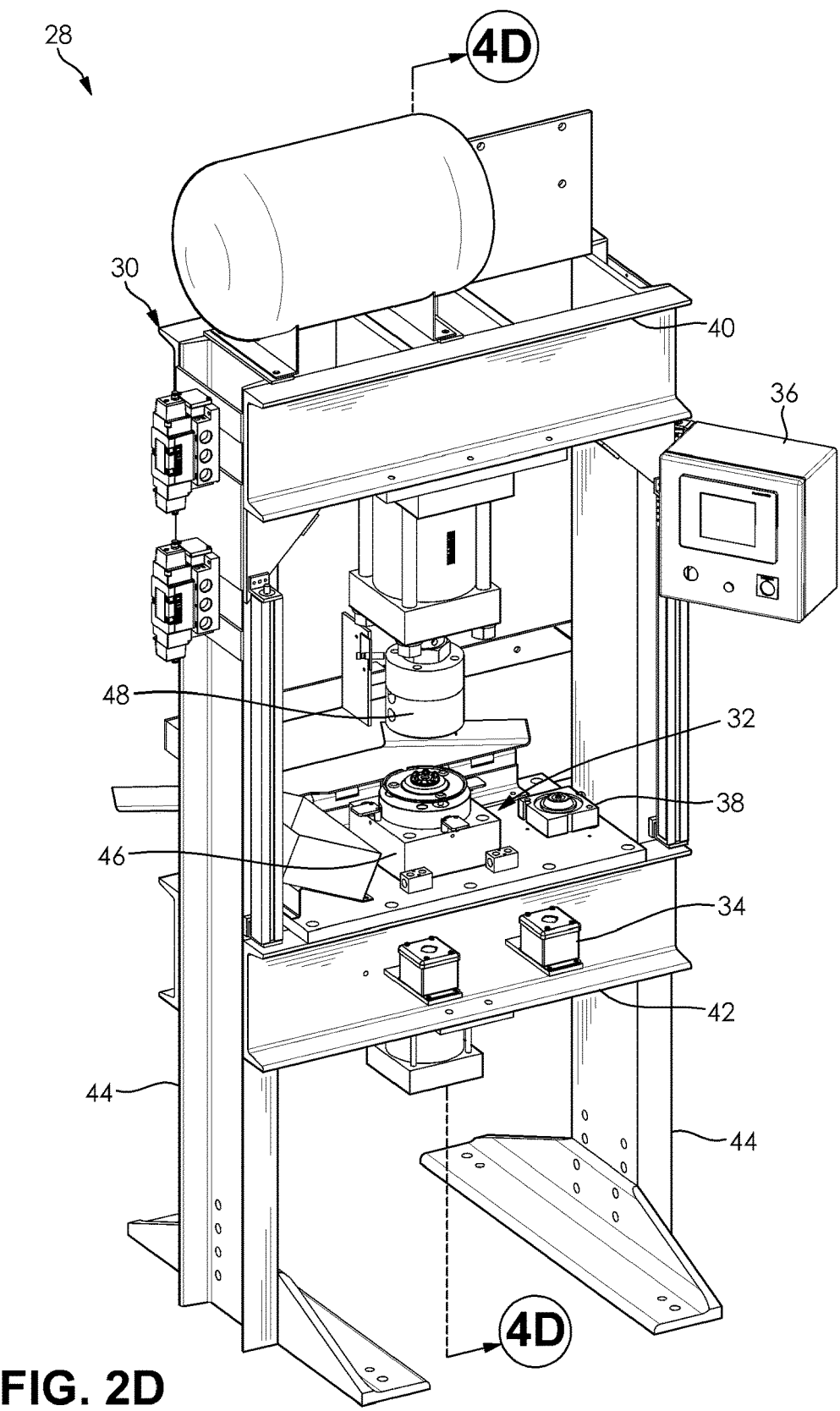
FIG. 2D is a front-left perspective view of a system for assembly of a top mount according to one embodiment of the disclosure, wherein the system is in an ejecting step wherein the assembled top mount is presented in a convenient position for removal from the system.

The upper die assembly 48 includes a pusher head assembly 94, as shown in FIG. 3A. The pusher head assembly 94 is configured to selectively move to and from a resting position, as shown in FIGS. 2A and 2D, and a crimping position, as shown in FIG. 2B.

The pusher head assembly 94 comprises a pusher head 96 having an opposing first end 98 and second end 100, a pusher head ring 102 attached to the second end 100 of the pusher head 96, and a dead stop 104. The pusher head ring 102 of the illustrative embodiment is annular in shape, and corresponds with the annular mounting flange 12 of the top mount body 4. It should be understood, however, that when a top mount body 4 having a different shape is used, the pusher head ring 102 will have a different corresponding shape. For example, for a tri-ovular top mount body 4, the corresponding pusher head ring 102 would be tri-ovular in shape.

The dead stop 104 of the pusher head assembly 94 is adjustably connected to and spaced apart from the second end 100 of the pusher head 96. The spacing between the dead stop 104 and the pusher head 96 is selectively adjustable to accommodate dimensional variations in journals 8 and top mount bodies 4. For example, the dead stop 104 may be adjusted to extend beyond the pusher head ring 102 in one embodiment, and may be adjusted to be disposed within the pusher head ring 102 in another embodiment. In the illustrative embodiment, the dead stop 104 is concentric with the annular ring, such that the dead stop 104 is axially aligned with a center axis of the journal opening 10 of the top mount body 4 when the pusher head assembly 94 is moved to the crimping position.

As further shown in FIG. 3A, a pusher head assembly actuator 106 is coupled to the first end 98 of the pusher head 96. The pusher head assembly actuator 106 causes the pusher head assembly 94 to be selectively moved to and from the resting position and the crimping position. In the illustrative embodiment, the pusher head assembly actuator 106 is a hydraulic actuator such as a hydraulic stroke cylinder; however, other types of actuators including electromechanical and pneumatic actuators, as nonlimiting examples, may also be used as the pusher head assembly actuator 106 within the scope of the disclosure.

More specifically, the pusher head assembly actuator 106 is capable of exerting a downward force of fifty tons on the pusher head assembly 94 when the pusher head assembly 94 is selectively moved to the crimping position. It has been surprisingly found that a downward force of fifty tons is sufficient to crimp the knurled studs 6 within the stud holes 14 of the top mount body 4 without undesirably deforming a remainder of the top mount body 4. However, other downward forces by the pusher head assembly actuator 106 may also be selected by one of ordinary skill in the art, as desired.

The plurality of sensors 34 is in communication with the controller 36, and includes at least one position sensor and one force sensor, which may be disposed within the system in appropriate locations. The force sensor provides feedback on a force applied by the pusher head assembly 94. Another force sensor may provide feedback on a force applied by the pusher shaft 72. A position sensor may provide feedback on a position of the floating die top 64. Another position sensor may provide feedback on a position of the pusher shaft 72. Additional proximity sensors are disposed on the lower die assembly 46 to provide feedback that the component parts of the top mount 2 are present in the die assembly 32. Yet another sensor 34 may provide feedback on a received input from a system operator, signaling that the system is ready for operation, e.g., the top mount body 4 and the knurled studs 6 are in place and ready to be processed. A skilled artisan may select other suitable types and numbers of sensors in communication with the controller 36, as desired.

The controller 36 is in communication with the die assemblies and the plurality of sensors 34. As illustrated, the controller 36 is attached to the press frame 30; however, the controller 36 may be independently situated from the press frame 30 in certain embodiments. The controller 36 may include a user interface having a display and inputs, where the user can adjust outputs communicated to the die assemblies from the controller 36, such as forces to be applied by the upper and lower die assemblies, for example.

Figure 3B:
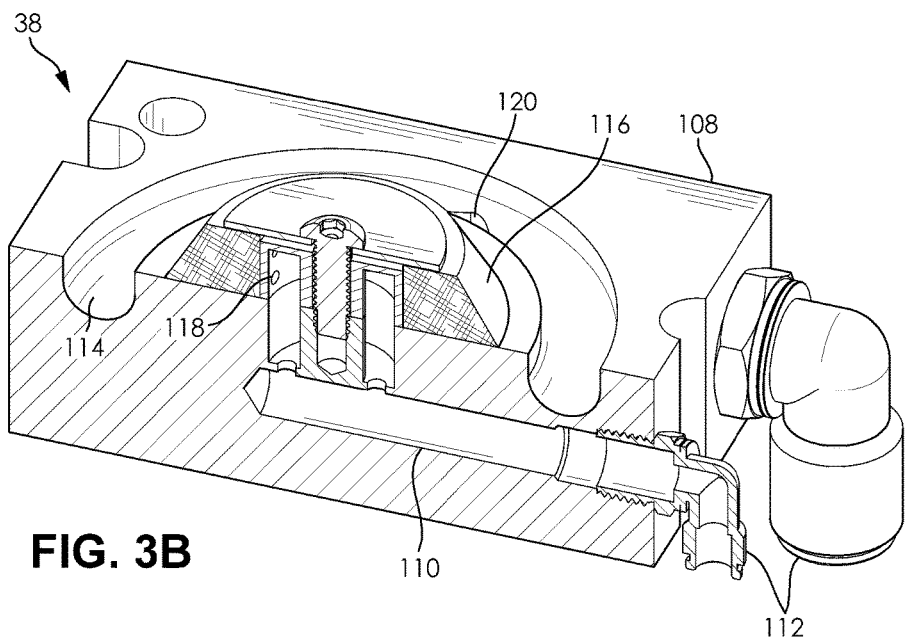
FIG. 3B is cross-sectional perspective view of an oiler assembly taken along section line 3B-3B in FIG. 2A.

The oiler assembly 38, shown in cross-section in FIG. 3B, is positioned on the press bed 42 adjacent to the lower die assembly 46. The oiler assembly 38 is configured to receive the top mount body 4, and apply a lubricant to the inner surface of the top mount body defining the journal opening 10. The oiler assembly 38 includes an oil base 108 having an oil delivery conduit 110 in fluid communication with a source 112 of the lubricant. An oil drainage channel 114 is formed in an upper surface of the oil base 108. A felt wick 116 is disposed atop the oil base 108, and is in fluid communication with the oil delivery conduit 110. The felt wick 116 is configured to contact the inner profile of the journal opening 10 to apply the lubricant thereon.

In the illustrative embodiment of FIG. 3B, the felt wick 116 is frustoconical and abuts a lubricant distributing weep cap 118, which has a plurality of ports and is in fluid communication with the oil delivery conduit 110. The oil drainage channel 114 includes an outlet 120 in fluid communication with the source 112 of the lubricant. Excess oil is returned to the source 112 of the lubricant to be continuously cycled through the oiler assembly 38.

The present disclosure further includes a method 300 for manufacturing the top mount 2 utilizing the press assembly 28 described herein, as shown in FIGS. 2A-7.

Figure 4A:
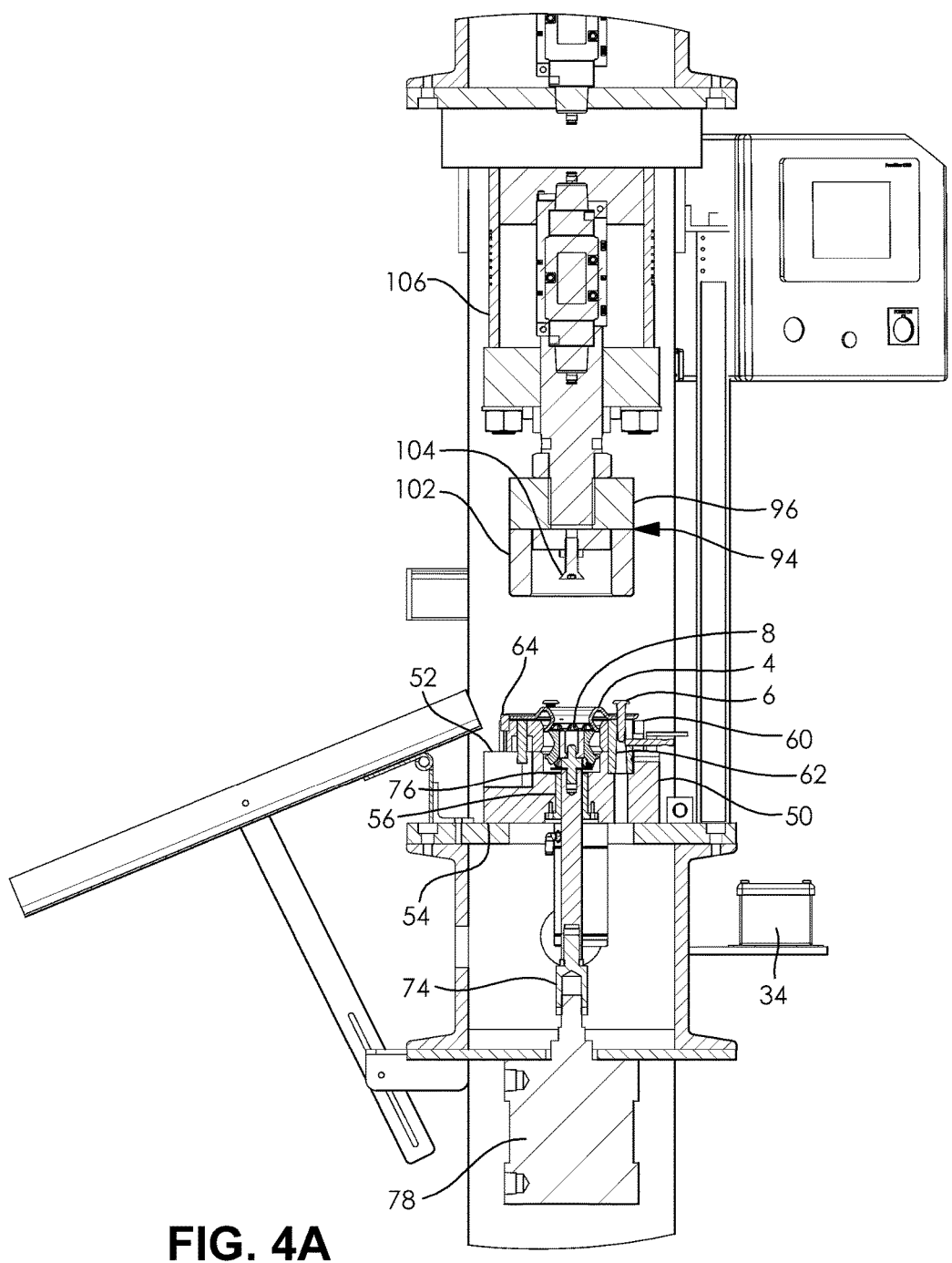
FIG. 4A is a cross-sectional side elevational view of the system taken along section line 4A-4A in FIG. 2A.
Figure 7:
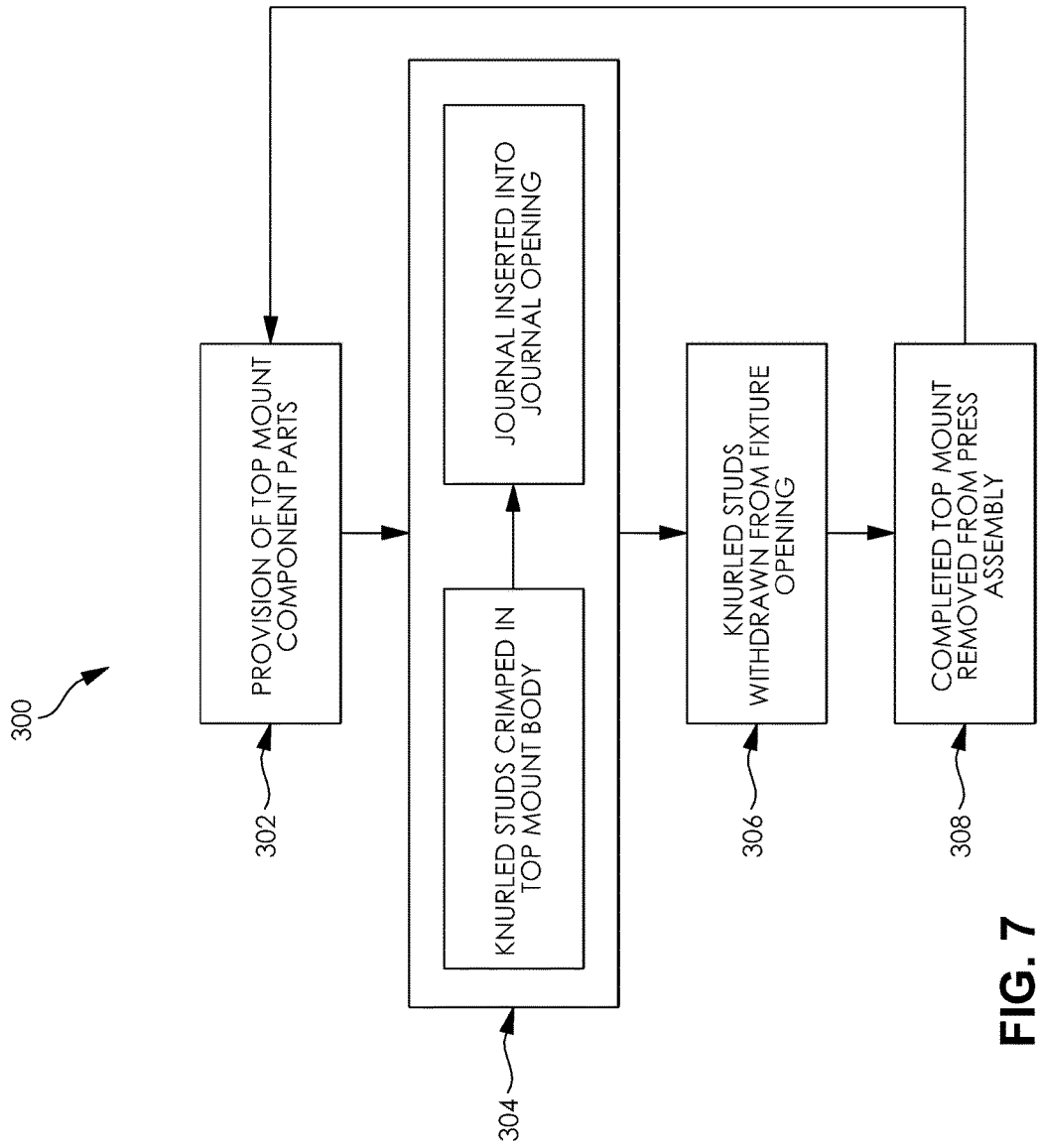
FIG. 7 is flow diagram illustrating the method for assembly of a top mount according to one embodiment of the present disclosure.

Referring to FIG. 7, the method 300 includes a loading step 302, an assembly step 304, a stripping step 306, and an ejecting step 308. Initially, the die assembly 32 is placed in a loading step 302, as shown in FIGS. 2A and 4A. The operator then provides the components of the top mount 2, including the top mount body 4, the plurality of studs 6, and the journal 8. The journal 8 is first received and aligned within the primary opening 66 of the floating die top 64, wherein the rigid sleeve 20 of the journal 8 receives the mandrel 84 of the center post 80 to maintain axial alignment of the journal 8 within the primary opening 66, and the journal 8 rests atop the collar 86 of the center post 80.

The operator next applies the journal opening 10 of the top mount body 4 to the felt wick 116 of the oiler assembly 38 to provide a coating of lubricant to the journal opening 10. Subsequently, the lubricated top mount body 4 is placed atop the crimp blocks 60. The stud holes 14 of the top mount body 4 are aligned with the fixture holes 62 of the crimp blocks 60. The plurality of knurled studs 6 are then inserted through the stud holes 14 of the top mount body 4, wherein the threaded shank 24 of each knurled stud 6 is received in the respective fixture holes 62 of the crimp blocks 60. The knurled shoulder 26 of the knurled studs 6 abuts an upper face of the flange of the top mount body 4, adjacent each of the stud holes 14.

Figure 4B:
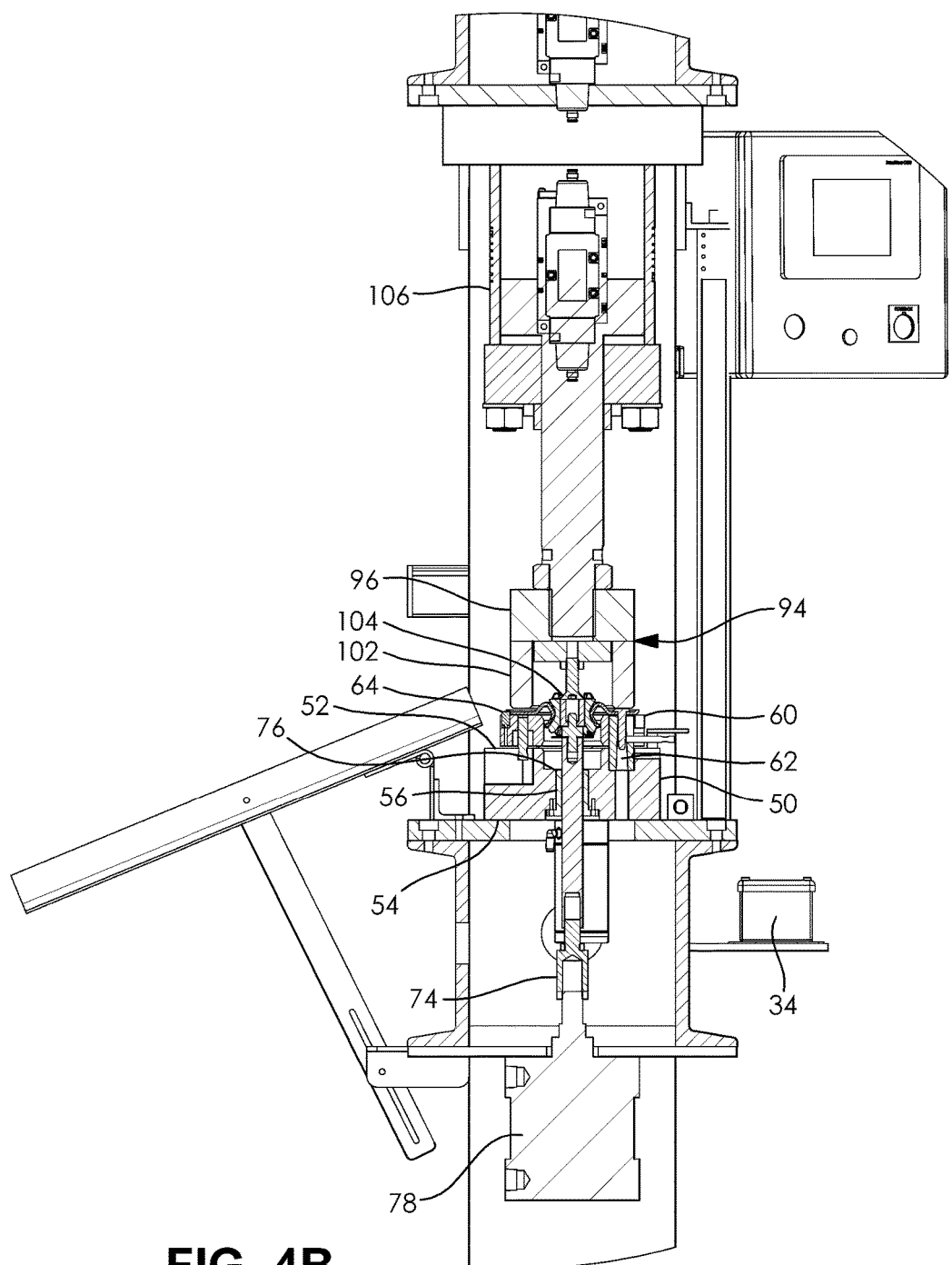
FIG. 4B is a cross-sectional side elevational view of the system taken along section line 4B-4B in FIG. 2B.

With provision of the components complete, the plurality of sensors 34 provide feedback to the controller 36 that the system is ready to begin an assembly step 304 including a crimping operation and a journal insertion operation. In the assembly step 304, as shown in FIGS. 2B and 4B, the knurled studs 6 and the journal 8 are substantially simultaneously affixed to the top mount body 4. During the assembly step 304, the pusher head assembly 94 first moves from the resting position, as shown in FIG. 2A, to the crimping position shown in FIG. 2B, wherein a downward force is applied to the pusher head assembly 94 by the pusher head assembly actuator 106. In the crimping position, the pusher head ring 102 contacts the heads 22 of the knurled studs 6. The pusher head assembly actuator 106 applies a predetermined downward force, for example, of about fifty tons to the heads 22 of knurled studs 6, pressing the knurled shoulders 26 through the stud holes 14 to form an interference fit between the protrusions of the knurled shoulders 26 and the inner diameters of the stud holes 14. Once the knurled shoulders 26 have been pressed through the stud holes 14, the predetermined downward force is transferred through the knurled studs 6 to the top mount body 4, and causes the crimp blocks 60 to crimp the stud holes 14 around the knurled studs 6, further securing the knurled studs 6 in the crimping operation.

Once the controller 36 receives feedback from the force sensor 34 that the predetermined downward force has been applied and maintained, the pusher shaft 72 then moves from a retracted position, as shown in FIG. 2A, to the inserting position shown in FIG. 2B, wherein the collar 86 of the center post 80 applies an upward force to the journal 8 sufficient to insert the journal 8 into the journal opening 10 in the journal insertion operation. The dead stop 104 of the pusher head assembly 94 is present in an opposing end of the journal opening 10 to prevent the journal 8 from being over-inserted beyond the journal opening 10.

Figure 4C:
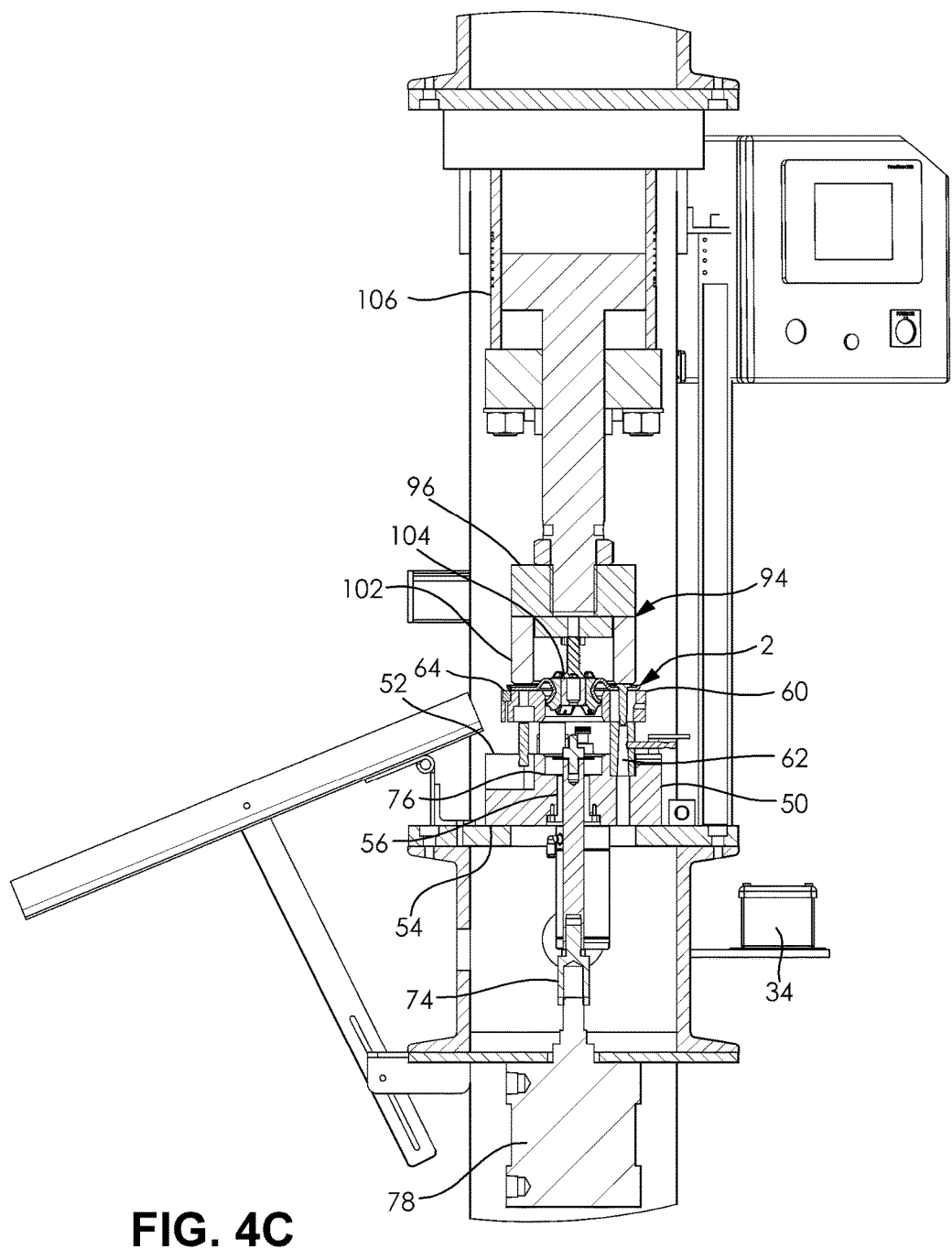
FIG. 4C is a cross-sectional side elevational view of the system taken along section line 4C-4C in FIG. 2C.

With the assembly step 304 complete, the die assembly 32 progresses to a stripping step 306. In the stripping step 306, the floating die top 64 is advanced apart from the stationary die base 50 a predetermined distance. As the floating die top 64 is advanced apart from the stationary die base 50, the knurled studs 6 of the top mount 2 are withdrawn from the fixture holes 62 of the crimp blocks 60. The predetermined distance is any distance sufficient to withdraw the threaded shank 24 of the knurled studs 6 from the crimp blocks 60, and is dependent on the length of the threaded shank 24. During the stripping step 306, the pusher head assembly 94 also moves in tandem with the floating die top 64 to an intermediate position, as shown in FIGS. 2C and 4C, thereby sandwiching the top mount body 4 therebetween.

Figure 4D:
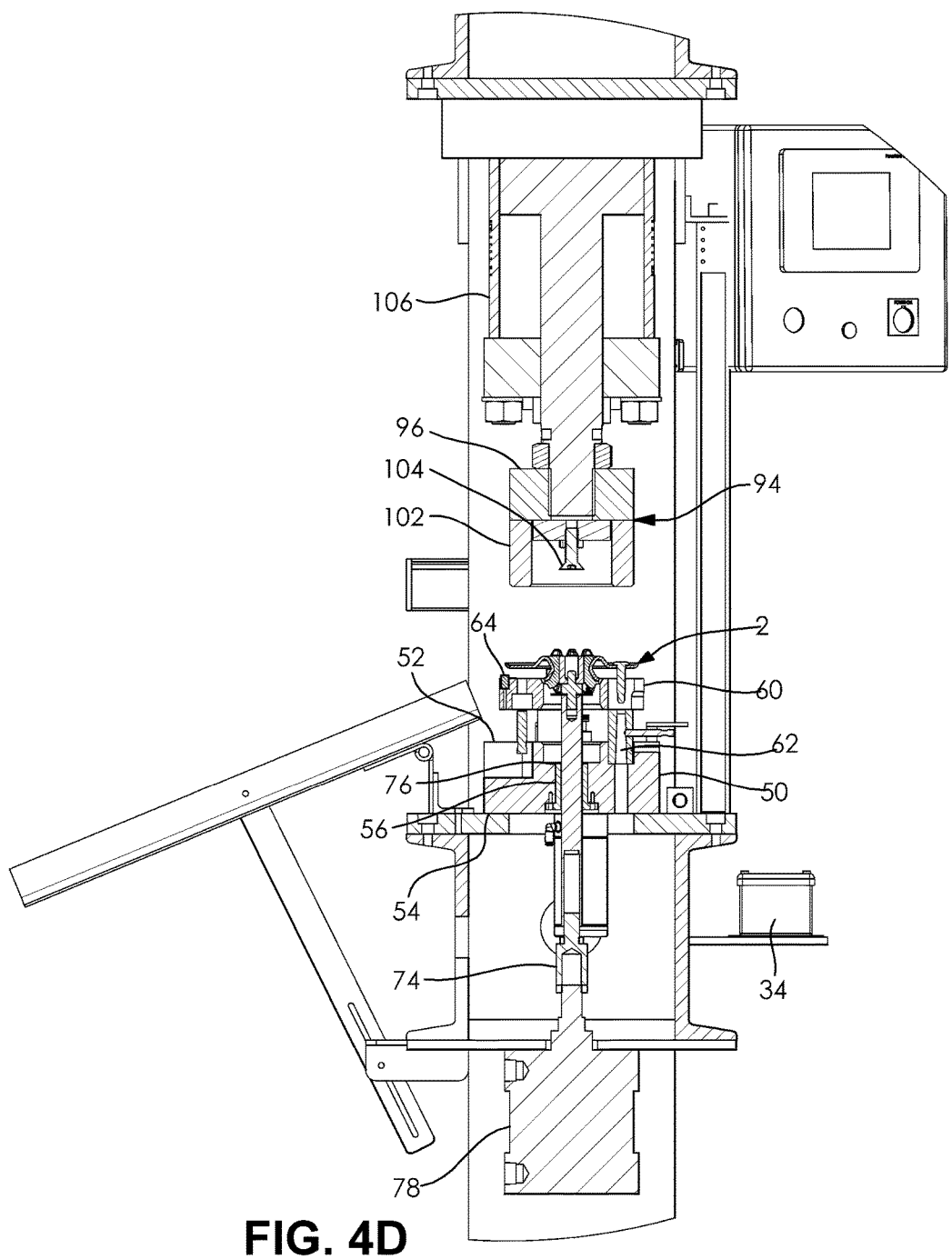
FIG. 4D is a cross-sectional side elevational view of the system taken along section line 4D-4D in FIG. 2D.

Subsequent to the stripping step 306, the press assembly 28 proceeds to an ejecting step 308 shown in FIGS. 2D and 4D. In the ejecting step 308, wherein the top mount 2 is presented to the operator for removal from the press assembly 28. With the knurled studs 6 mostly removed from the crimp blocks 60, the pusher head assembly 94 is fully retracted to the resting position, and the floating die top 64 is returned to abut the top face 52 of the stationary die base 50. Upon retraction of the floating die top 64, an interference fit of a lower portion of the knurled studs 6 with the crimp blocks 60 causes the top mount 2 to be supported by the crimp blocks 60 in a convenient presentation for removal from the press assembly 28. The operator may then return to the loading step 302, and the method 300 may be repeated to manufacture further top mounts 2.

Advantageously, the system and method for manufacturing the top mount 2 of the present disclosure involves a single station or press assembly 28. Likewise, the system and method is efficient and permits a rapid manufacture of the top mount 2 by an individual operator, which has heretofore not been possible with conventional top mount manufacturing systems.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for manufacturing a top mount of a vehicle suspension, the method comprising the steps of:
   providing a top mount body having an opening and a plurality of stud holes, a plurality of knurled studs, and an insert body;
   inserting the knurled studs in the stud holes of the top mount body; and
   applying a pressure to the knurled studs to press the knurled studs into top mount body and to crimp the knurled studs in the stud holes of the top mount body, and to insert the insert body into the opening of the top mount body.

2. The method of claim 1, further comprising the step of providing a system for manufacturing the top mount of the vehicle suspension, including:
   a floating die top configured to receive the top mount body, the floating die top having a primary opening and a plurality of secondary openings formed therethrough, the primary opening configured to receive and align the insert body adjacent the opening of the top mount body; and
   a stationary die base having a plurality of crimp blocks, the crimp blocks disposed in the secondary openings of the floating die top, the floating die top slidably disposed over the crimp blocks, each of the crimp blocks configured to receive one of the knurled studs.

3. The method of claim 2, wherein the floating die top is selectively positionable between a first position and a second position, the crimp blocks of the stationary die base extending through and protruding from the secondary openings of the floating die top when the floating die top is in the first position, and the crimp blocks spaced below the secondary openings of the floating die top when the floating die top is in the second position.

4. The method of claim 3, wherein the system further includes:
   a pusher head assembly configured to selectively move to and from a resting position and a crimping position, the pusher head assembly in the crimping position contacting the knurled studs to press the knurled studs into the top mount body and causing the crimp blocks of the stationary die base to crimp the top mount body adjacent the knurled studs to thereby affix the knurled studs to the top mount body.

5. The method of claim 4, wherein the floating die top moves a predetermined distance in tandem with the pusher head assembly as the pusher head assembly moves toward the resting position following the applying of the pressure to the knurled studs to insert and crimp the knurled studs in the stud holes of the top mount body, and the applying of the pressure to the insert body to insert the insert body into the opening of the top mount body.

6. The method of claim 4, wherein the top mount of the vehicle suspension is presented assembled and ready for removal from the system by a returning of the floating die top to a beginning position following the moving of the floating die top the predetermine distance in tandem with the pusher head, the top mount where presented is supported by an interference fit of the knurled studs with the crimp blocks.

7. A method for manufacturing a top mount of a vehicle suspension, the method comprising the steps of:
   providing a system for manufacturing the top mount of the vehicle suspension, including:
      a floating die top configured to receive the top mount body, the floating die top having a primary opening and a plurality of secondary openings formed therethrough, the primary opening configured to receive and align an insert body adjacent the opening of the top mount body;
      a stationary die base having a plurality of crimp blocks, the crimp blocks disposed in the secondary openings of the floating die top, the floating die top slidably disposed over the crimp blocks, each of the crimp blocks configured to receive one of the knurled studs
      a pusher head assembly configured to selectively move to and from a resting position and a crimping position, the pusher head assembly in the crimping position contacting the knurled studs to press the knurled studs into the top mount body and causing the crimp blocks of the stationary die base to crimp the top mount body adjacent the knurled studs to thereby affix the knurled studs to the top mount body.

8. A method for manufacturing a top mount of a vehicle suspension, the method comprising the steps of:
   providing a top mount body having an opening and a plurality of stud holes, a plurality of knurled studs, and an insert body all to a system for manufacturing the top mount;
   inserting the knurled studs in the stud holes of the top mount body; and
   using the system to apply a pressure to the knurled studs to press the knurled studs into top mount body and to crimp the knurled studs in the stud holes of the top mount body, and to insert the insert body into the opening of the top mount body; and
   ejecting the top mount of the of the vehicle suspension from the system following the applying of the pressure to the knurled studs to insert and crimp the knurled studs in the stud holes of the top mount body, and the applying of the pressure to the insert body to insert the insert body into the opening of the top mount body.

* * * * *